(12) United States Patent  
Duarte

(10) Patent No.: US 6,636,419 B2
(45) Date of Patent: Oct. 21, 2003

(54) HANDHELD DISPLAY AND KEYBOARD

(75) Inventor: Matias G. Duarte, San Francisco, CA (US)

(73) Assignee: Danger, Inc., Palo Alto, CA (US)

( * ) Notice: Subject to any disclaimer, the term of this patent is extended or adjusted under 35 U.S.C. 154(b) by 0 days.

(21) Appl. No.: 09/927,114

(22) Filed: Aug. 9, 2001

(65) Prior Publication Data

US 2003/0030971 A1 Feb. 13, 2003

(51) Int. Cl.[7] .................................................. G06F 1/16
(52) U.S. Cl. ...................... 361/680; 345/905; 361/681; 312/223.2
(58) Field of Search ................................. 361/680, 679, 361/681–686, 724–727; 345/905, 156, 169; 349/58; 312/223.1–223.2; 400/88, 652

(56) References Cited

U.S. PATENT DOCUMENTS

| | | | |
|---|---|---|---|
| 4,237,540 A | 12/1980 | Sato | 364/708 |
| 5,224,060 A * | 6/1993 | Ma | 364/708 |
| 5,268,817 A | 12/1993 | Miyagawa et al. | 361/729 |
| 5,278,779 A | 1/1994 | Conway et al. | 364/708.1 |
| 5,548,478 A * | 8/1996 | Kumar et al. | 361/681 |
| 5,638,257 A | 6/1997 | Kumar et al. | 361/680 |
| 5,900,848 A | 5/1999 | Haneda et al. | 345/5 |
| 5,949,408 A | 9/1999 | Kang et al. | 345/169 |
| 6,433,777 B1 * | 8/2002 | Sawyer | 361/680 |
| 6,446,004 B1 * | 9/2002 | Cao et al. | 701/213 |

* cited by examiner

*Primary Examiner*—Darren Schuberg
*Assistant Examiner*—Hung Van Duong
(74) *Attorney, Agent, or Firm*—Blakely, Sokoloff, Taylor & Zafman LLP

(57) ABSTRACT

A handheld keyboard and display device is disclosed. The device includes a keyboard and a display. The display is movably coupled to the keyboard and the display covers a portion of the keyboard in a closed position and substantially uncovers the keyboard in an open position. The display is visible in both the closed position and in the open position.

13 Claims, 8 Drawing Sheets

HANDHELD DISPLAY AND KEYBOARD

CROSS-REFERENCE TO RELATED APPLICATIONS

This application is related to the co-pending application U.S. Ser. No. 09/714,320, filed Nov. 15, 2000, entitled "Adjustable Data Processing Display" which is assigned to the assignee of the present application.

FIELD OF THE INVENTION

The present invention is related to handheld electronic devices and more specifically to the user interface of handheld electronic devices.

BACKGROUND OF THE INVENTION

Handheld electronic devices include many types of devices such as cellular telephones, test equipment, pagers, and handheld computing devices. Each of these types of handheld electronic devices includes a user interface of a display and some type of a keyboard. Often the user interface for a handheld electronic device also includes knobs, wheels, joysticks and other types of user input devices. Handheld computing devices typically require the most complicated user interfaces so that the users have many features and options of use of the handheld computing device. Because the user interface on a handheld computing device is typically the most complicated, then the handheld computing device is used as an example to describe various user interfaces. However, as described herein, the various embodiments of user interfaces could also be applied to other types of handheld electronic devices, not limited to only those types of devices described above.

Handheld computing devices must be small. A handheld computing device requires a user-friendly interface. In various approaches to manufacturing handheld computing devices, the user interface has been compromised in one manner or another to reduce the physical size. Often the size reductions include combining multiple functions in each input device such as multiple function keys on an abbreviated keyboard.

In one approach, such as a PalmPilot from Palm Computing, Inc, a separate keyboard is eliminated and a touch screen interface is used. In another approach, a cellular telephone-type user interface is used. The cellular telephone-type user interface has a small display and an abbreviated keyboard that is typically a slightly enhanced, 10-key numeric keypad. In still another approach, such as a Hewlett Packard, Jornada 700 Series Handheld PC, a full QUERTY keyboard is included but the display is folded or closed over the keyboard. Covering the keyboard with the display decreases the physical size of the handheld PC but also removes the display from the view of the user and blocks the user from access to the keyboard.

What is needed is a handheld computing device that has a larger display and a larger keyboard than a cellular telephone-type interface and where the display is visible at all times.

SUMMARY OF THE INVENTION

A handheld keyboard and display device is disclosed. The device includes a keyboard and a display. The display is movably coupled to the keyboard and the display covers a portion of the keyboard in a closed position and substantially uncovers the keyboard in an open position. The display is visible in both the closed position and in the open position.

BRIEF DESCRIPTION OF THE DRAWINGS

The present invention is illustrated by way of example and not limitation in the figures of the accompanying drawings in which like references indicate similar elements.

DETAILED DESCRIPTION

A handheld keyboard and display device is disclosed. The device includes a keyboard and a display. The display is movably coupled to the keyboard and the display covers a portion of the keyboard in a closed position and substantially uncovers the keyboard in an open position. The display is visible in both the closed position and in the open position. In one embodiment, the disclosed device includes a display that rotates 180 degrees about a pivot and the data displayed on the display is automatically rotated on the display.

Figure 1A:
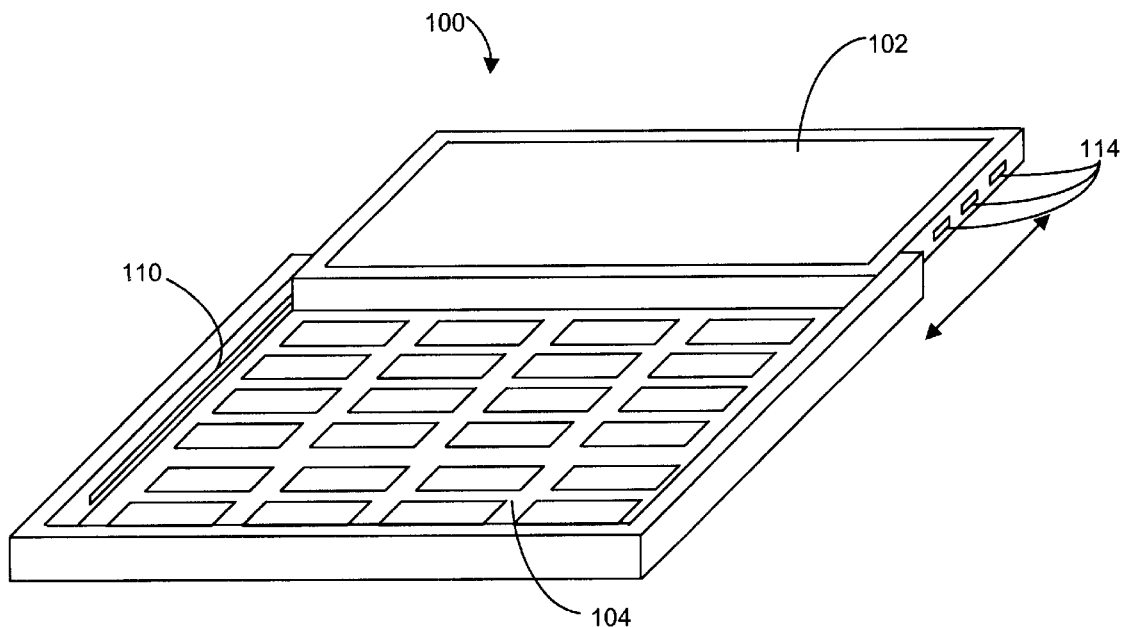
FIGS. 1 and 1A illustrate one embodiment of a handheld keyboard and display device.
Figure 1:
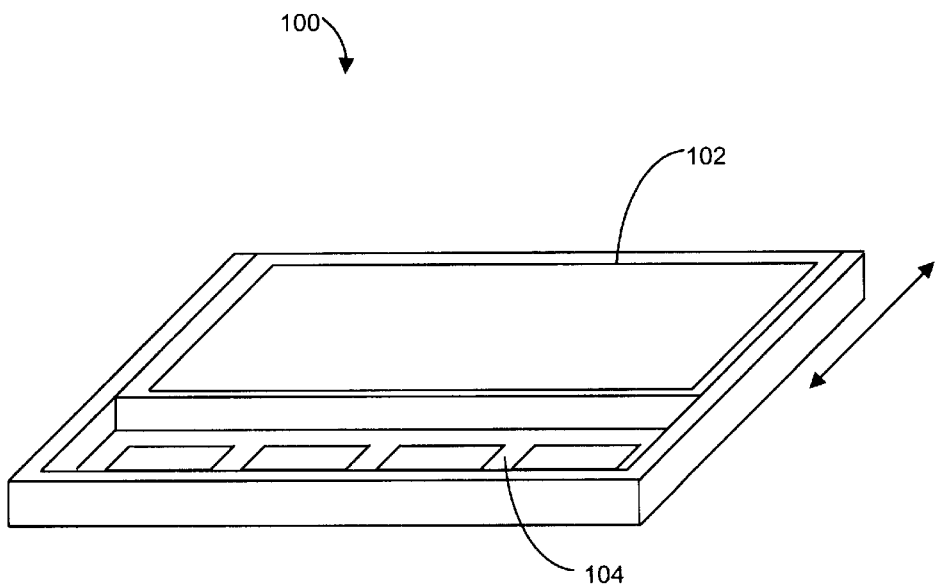

FIGS. 1 and 1A illustrate one embodiment of a handheld keyboard and display device 100. FIG. 1 shows the handheld keyboard and display device 100 in a closed position. FIG. 1A shows the handheld keyboard and display device 100 in an open position. In one embodiment, the entire keyboard 104 is covered by the display 102 in the closed position. Alternatively, as shown in FIG. 1, a portion of the keyboard 104 is not covered by the display 102 in the closed position. As shown in FIGS. 1 and 1A the display 102 is parallel to the keyboard 104 in the closed position and in the open position as shown in FIG. 1A. A significant feature of this embodiment is that at all times the display 102 is visible i.e. not covered and available to use whether the display 102 is in open or a closed position.

In one embodiment the sides of the handheld keyboard and display device 100 include tracks 110 similar to a drawer track that allows the display 102 to slide between the open and closed positions. The display 102 includes a complimentary pin or pins, track or other engagement device 114 to engage the tracks 110. In one embodiment, one track 110 is used on one side of the handheld keyboard and display device 100. Alternatively, track 110 can include multiple tracks on one or both sides of the handheld keyboard and display device 100. For example, multiple tracks could be used on one side of the handheld keyboard and display device 100 and the engagement device 114 on the display 102 could include a complimentary track that interlocks into one or more of the tracks 110. In one embodiment, latches can be included in the tracks 110 and/or in the track engagements 114 so that the display is latched in the open or closed position.

Figure 2:
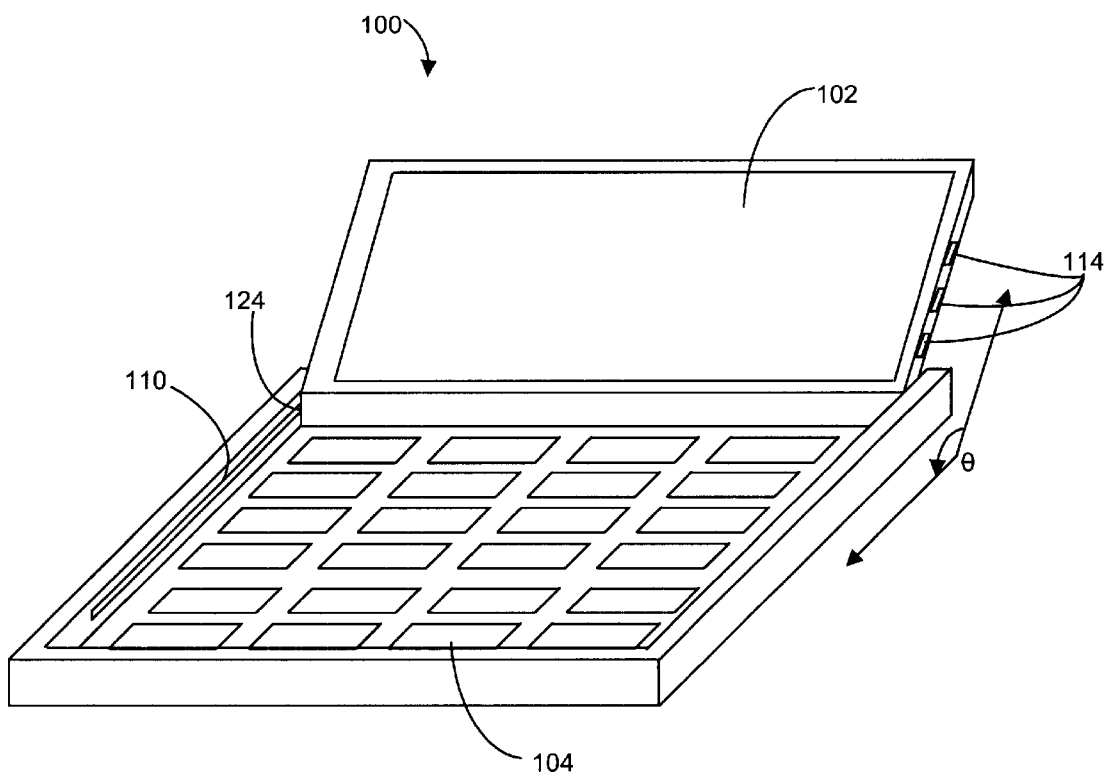
FIG. 2 illustrates another embodiment of the handheld keyboard and display device.

FIG. 2 illustrates another embodiment of the handheld keyboard and display device 200 in the open position. The display 102 slides from the closed position as described in FIGS. 1 and 1A above but in FIG. 2, the display 102 is allowed to pivot vertically so that it is no longer parallel with the keyboard 104. Pivoting the display 102 as shown in FIG. 2 can provide improved visibility of the display 102 or possibly improved balance of the handheld keyboard and display device 200 in the open position. In the open position, the display 102 forms an angle θ with the keyboard 104. While the angle θ shown is less than 180 degrees, In alternative embodiments, the angle θ could also be greater than 180 degrees. In one embodiment, the angle θ is determined by a wedge or similar pivot (not shown) located behind the display 102. Alternatively, display 102 can include a ratcheting pivot at the track engagements 122, 124 so that the angle θ can be vary within a range of, for example 0–360 degrees. A variable angle θ allows the display to be placed in any convenient angle relative to the keyboard 104.

Figure 3A:
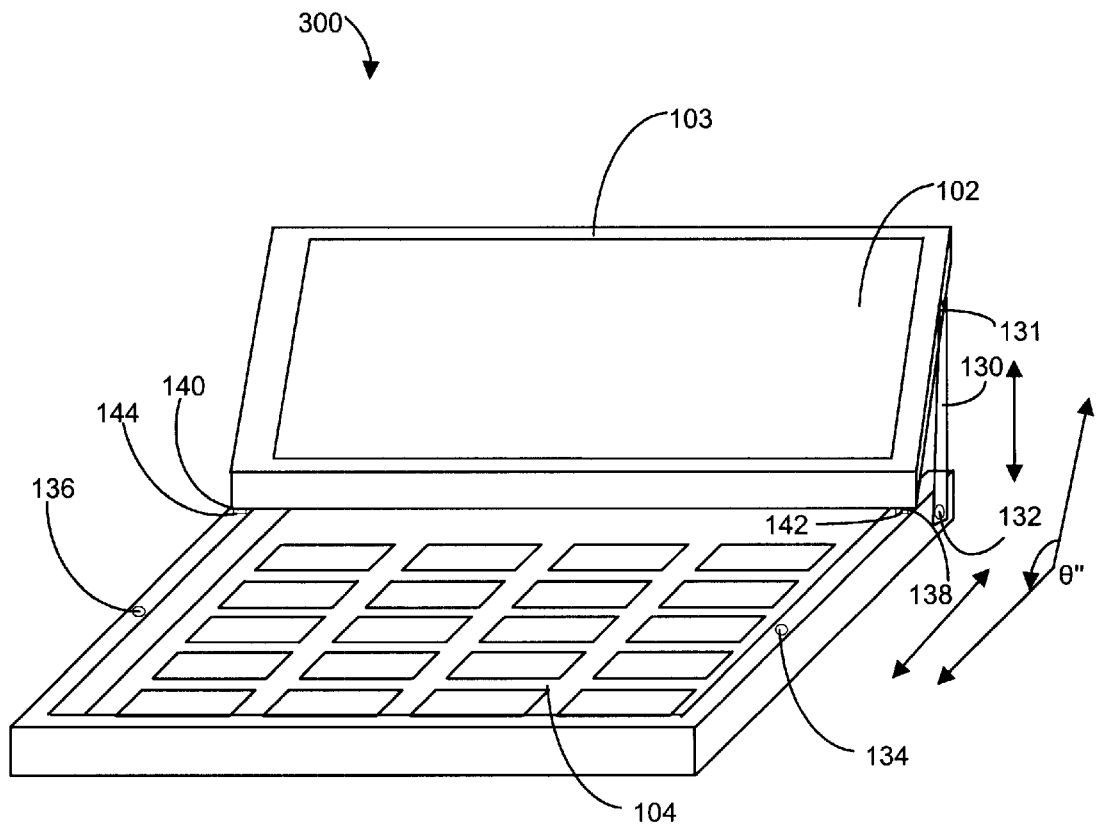
FIGS. 3 and 3A illustrate another embodiment of a handheld keyboard and display device.
Figure 3:
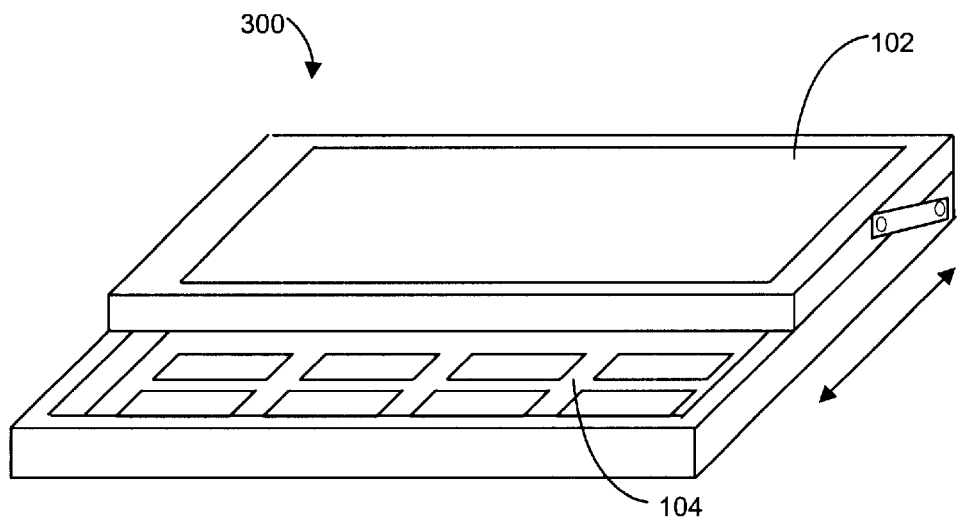

FIGS. 3 and 3A illustrate another embodiment of a handheld keyboard and display device 300. FIG. 3 shows the handheld keyboard and display device 300 in a closed position. In the closed position, the display 102 substantially covers the keyboard 104. Alternatively, the display could cover the entire keyboard 104. FIG. 3A shows the handheld keyboard and display device 300 in an open position. In one embodiment, the display 102 includes a support 130. The support 130 is coupled to the display 102 and pivot 131 and to the keyboard 104 and pivot 132. The support 130 allows the display 102 to shift from a flat, closed position that is parallel to the keyboard 104, to an open position at an angle θ", that is supported by the support 130, as shown in FIG. 3A. The support 130 can also include second support mounted on the opposite side of the display 102 so that the display 102 is evenly supported. In an alternative embodiment, the support could be a different shape such as a flat plate and/or located in a different position such as in the back side 103 (i.e. the side opposite the displaying surface) of the display 102 or centered in the back side 103 of the display 102. The pivots 131, 132 can also be detachable or permanent as required by the particular embodiment.

In one embodiment, the display 102 includes one or more latches to hold the display closed. For example, the display 102 could include two latches 138, 140 that couple to latch points 134, 136, respectively, in the sides of the handheld keyboard and display device 300. In one embodiment the latches 138, 140 can also be used to secure the display 102 at the angle θ" in additional latch points 142, 144, respectively. Alternatively, latch points 142, 144 can include multiple latch points so that the angle θ" can be varied based upon the latch points that the latches 138, 140 are latched to. The latches 138, 140 and latch points 134, 136, 142, 144 can include any type of latching mechanism such as a mechanical latch, a magnetic latch, a detent, a friction latch, a static latch or any other type or combination of latching mechanisms suitable for the application. In one embodiment the latches 138, 140 and latch points 134, 136, 142, 144 are inset into and/or can be flush with the corresponding surfaces of the display 102 and keyboard 104.

Figure 4:
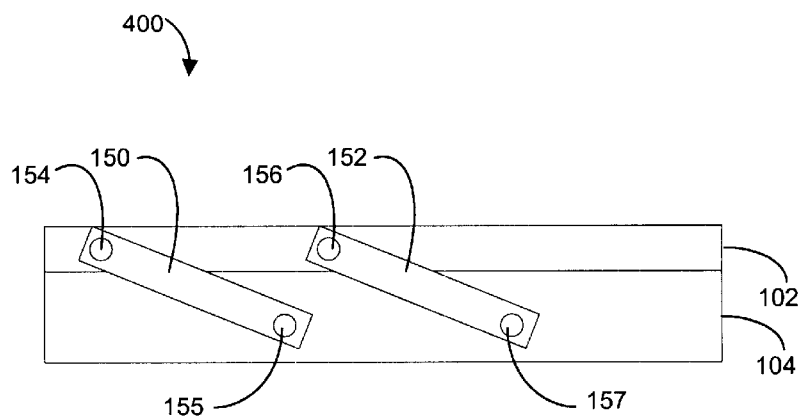
FIGS. 4–4B illustrate another embodiment of a handheld keyboard and display device.
Figure 4A:
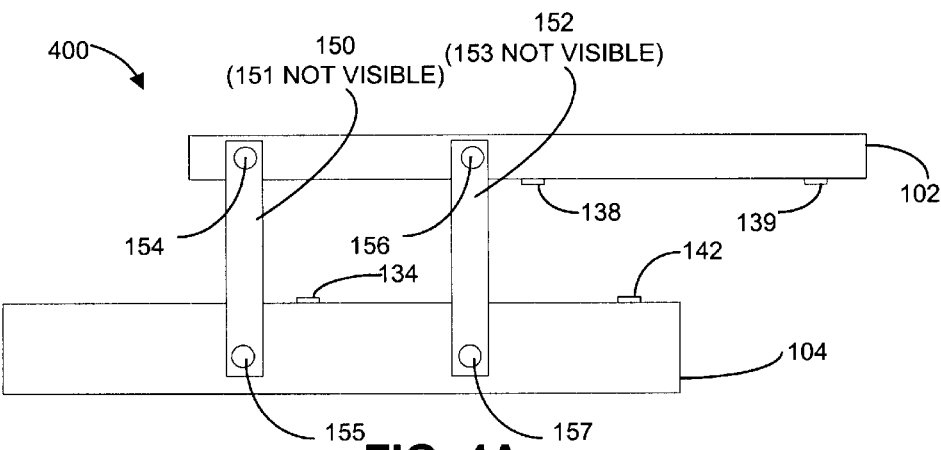
Figure 4B:
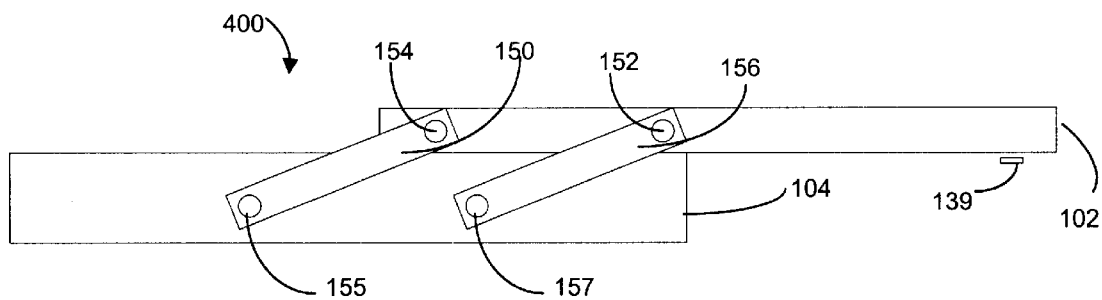

FIGS. 4–4B illustrate another embodiment of a handheld keyboard and display device 400. FIG. 4 shows the handheld keyboard and display device 400 in a closed position. FIG. 4A shows the handheld keyboard and display device 400 in a transition position between the open position and the closed position. FIG. 4B shows the handheld keyboard and display device 400 in an open position. Viewing FIGS. 4–4B in sequence, the display 102 and the keyboard 104 remain substantially parallel (i.e. within +/−20 degrees from parallel) throughout the movement from the closed position shown in FIG. 4, through the mid-way, transition position shown in FIG. 4A, to the open position shown in FIG. 4B.

In one embodiment, the display 102 and the keyboard 104 are maintained parallel to one another by a parallelogram assembly formed by the display 102 and the keyboard 104 and the supports 150, 151 (hidden), 152, 153 (hidden). Supports 150, 151 (hidden), 152, 153 (hidden) are all equal length to maintain the parallelogram shape. Supports 150, 152 are mounted on the side of the display 102 and the keyboard 104 that is visible in FIGS. 4–4A. Supports 151, 153 are mounted on the opposite side of the display 102 and the keyboard 104 that is not visible in FIGS. 4–4B. In FIG. 4A support 151 is hidden by support 150, similarly support 153 is hidden by support 152. In one embodiment, supports 150, 152 are coupled to the side of the display 102 and the keyboard 104 by pivots 154, 155 and 156, 157 respectively. Supports 151, 153 are coupled to the opposite side of the display 102 and the keyboard 104 by pivots (not shown) similar to supports 150, 152.

In one embodiment, latches 138, 139 connect with latch points 134, 142, respectively, when the display 102 is in the closed position so that the display 102 is latched in the closed position. Latch 138 connects to latch point 142 when the display 102 is in the open position so that the display 102 is latched in the open position. Additional latches can also be added to provide more positive latching.

Figure 5:
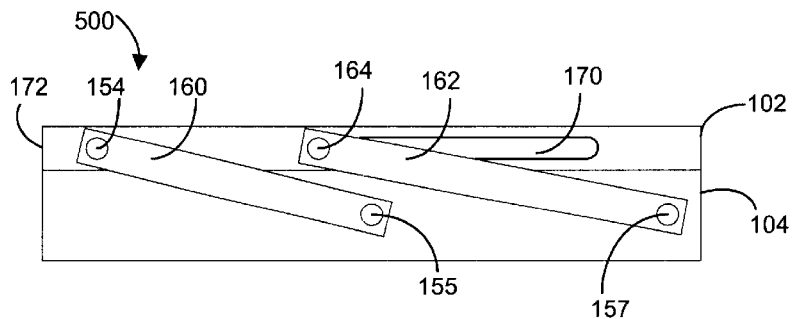
FIGS. 5–5B illustrate another embodiment of a handheld keyboard and display device.
Figure 5A:
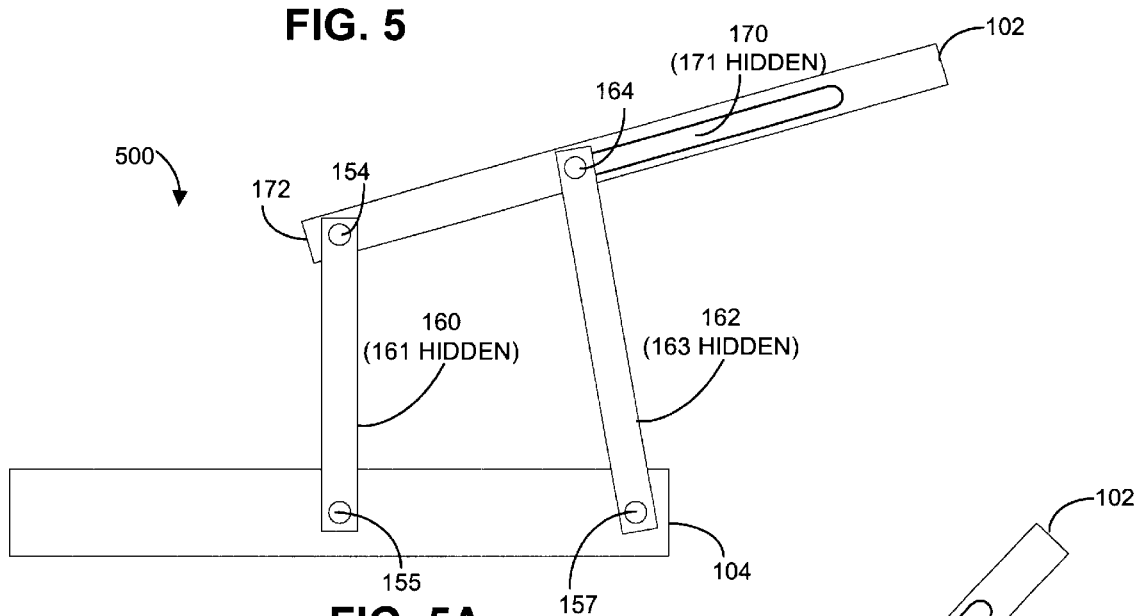
Figure 5B:
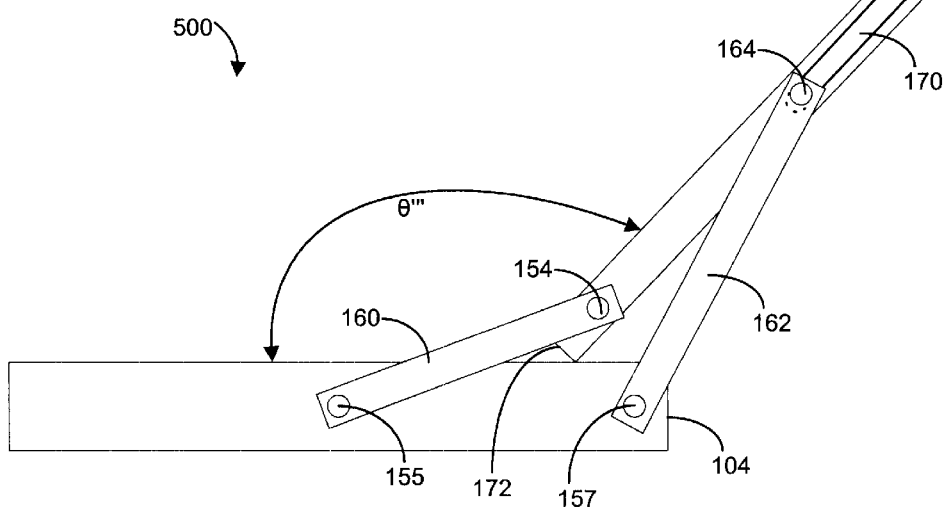

FIGS. 5–5B illustrate another embodiment of a handheld keyboard and display device 500. FIG. 5 shows the handheld keyboard and display device 500 in a closed position. FIG. 5A shows the handheld keyboard and display device 500 in a transition position between the open position and the closed position. FIG. 5B shows the handheld keyboard and display device 500 in an open position. Viewing FIGS. 5–5B in sequence, the display 102 and the keyboard 104 do not remain parallel throughout the movement from the closed position shown in FIG. 5, through the mid-way, transition position shown in FIG. 5A, to the open position shown in FIG. 5B. In the open position, the display 102 is held at an angle θ'" to the keyboard 104.

In one embodiment, the display 102 and the keyboard 104 are coupled together by unequal length supports 160, 162. Supports 160, 162 are mounted on the side of the display 102 and the keyboard 104 that is visible in FIGS. 5–5B. Supports 161, 163 are mounted on the opposite side of the display 102 and the keyboard 104 that is not visible in FIGS. 5–5B. In FIG. 5A support 161 is hidden by support 160, similarly support 163 is hidden by support 162. In one embodiment, support 160 is coupled to the side of the display 102 and the keyboard 104 by pivots 154, 155. Support 162 is coupled to the side of the keyboard 104 by pivot 157 and to the side of the display 102 by track engagement 164. Track engagement 164 engages track 170 in the side of the display 102. Supports 161, 163 are coupled to the opposite side of the display 102 and the keyboard 104 similar to supports 160, 162. As the display 102 shifts from the closed position shown in FIG. 5 to the open position in FIG. 5B the supports 162, 163 shift along the tracks 170, 171 respectively to allow the display 102 to rotate on the track engagements 164, 165 and extend supports 160, 161 over-center so that the forward end 172 of the display 102 contacts at least a portion of the top surface of the keyboard 104. The display is locked in the open position by the over-center effect of the shorter supports 160, 161 and the track engagements 164, 165 being held at the end of the respective tracks 170, 171.

Figure 6:
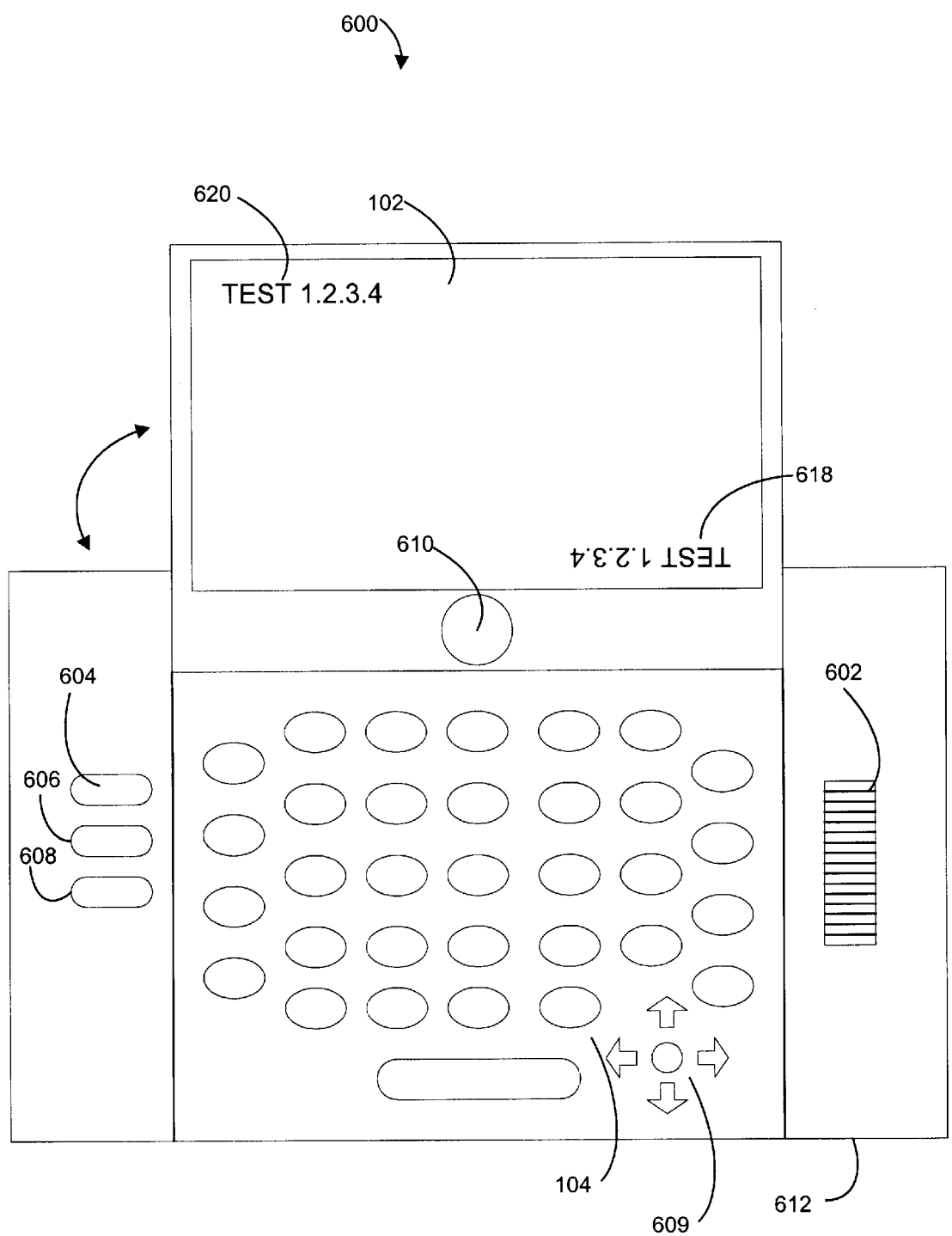
FIG. 6 illustrates another embodiment of any of the handheld keyboard and display devices described above in FIGS. 1–5B.

FIG. 6 illustrates another embodiment of any of the handheld keyboard and display devices 100–500 described above in FIGS. 1–5B. The handheld keyboard and display devices 100–500 can also include additional user interface devices such as a pointing device 602, selection buttons 604, 606, 608 and other user interface devices such as joysticks, mice, trackballs, trackpoint 609.

In one embodiment, the display 102 rotates about a pivot 610. For example, FIG. 6 shows one embodiment of the keyboard and display device in the open position so that the keyboard 104 is accessible. When the display 102 is rotated 180 degrees about the pivot 610, to the closed position, the keyboard 104 is substantially covered. In another embodiment, when data is displayed on the display 102 in the closed position (i.e. in data in position 618 and oriented as shown) and the display 102 is then rotated to the open position (as shown), then the information displayed on the display 102 is also automatically displayed in a 180 degrees "rotated" position at position 620 and oriented as shown in position 620. When the display 102 is in the open position (as shown) the data is no longer displayed at position 618. This allows the displayed information to be visible to a user in both the open and closed positions, from the same location i.e. the upper left corner of the display 102 in both the open position and the closed position.

In one embodiment, the display 102 is a liquid crystal display, or other similar monochrome or color display devices. The display 102 can also include a scratch resistant display surface such as glass or polycarbonate or other scratch resistant coating or outer layers as are known in the art. In one embodiment, the display also includes a removable transparent cover to protect the display screen. The transparent cover can also be a disposable cover. In one embodiment, the display 102 can also include a touch screen.

The display 102 is electrically coupled to the keyboard 104 to provide power and data for the displayed data. In one embodiment, the display 102 is electrically coupled to the keyboard 104 via a flex cable. For example, in the embodiments such as shown in FIGS. 1, 1A, 2, the flex cable is routed through one or both sides of the display. Similarly, in the embodiments shown in FIGS. 3–5B the flex cable can be routed through one or more of the supports 130, 150, 151, 152, 153, 160, 161, 162, 163. Similarly, in the embodiment shown in FIG. 6, the flex cable can be routed through the pivot 610. In any embodiment the flex cable can be any form of cable such as a coiled flex cable or other multiple conductor cables or optical fibers and similar data transmission media that are well known in the art. In an alternative embodiment the display can draw power from a separate power supply such as a battery or other power supply, i.e. solar, etc, that is included as part of the display.

Alternatively, the display can be electrically coupled to the keyboard via one or more contact points. For example, the display can have one or more electrical contacts that contact complimentary contacts on the keyboard. The contacts on the display and the keyboard can be located in substantially unseen locations such as on the back or sides of the display and in locations of the keyboard that are covered by the display. In one embodiment, the contacts on the display can meet with a first set of complimentary contacts on the keyboard in a closed position and a second set of complimentary contacts on the keyboard in an open position. Alternatively, the display can have multiple sets of contacts that meet with one or more sets of complimentary contacts on the keyboard. For example, as shown in FIGS. 1–6, the contacts on the display are coupled to a first set of complimentary contacts on the keyboard in the closed position of FIGS. 1, 3 4, 5 and a second set of complimentary contacts in the open position of FIGS. 1A, 2, 3A, 4B, 5B, 6.

In an alternative embodiment similar to that shown in FIG. 6, the electrical contacts between the display and the keyboard can be part of the pivot 610. For example the display can include a set of contacts that brush conductive bands on the pivot 610 as the display is rotated. Each of the conductive bands on the pivot 610 are connected to the keyboard.

In one alternative embodiment, the display is electrically coupled to the keyboard via a wireless signal such as a laser or an RF data link such as a bluetooth or similar wireless data link systems. Alternatively, a laser could be used to transmit the data between the display and keyboard via one or more optical fibers or by aligning optical ports on the display and the keyboard similar to the contact points described above.

In still another embodiment, the display can be electrically coupled to keyboard via one or more of the supports 130, 150, 151, 152, 153, 160, 161, 162, 163, wherein each one of the supports acts as a conductor to conduct electrical power and or signals to between the display and the keyboard. In still another embodiment, the display is electrically coupled to the keyboard. In one embodiment, the flex cable can be exposed, however this is a less desirable option because an exposed flex cable are typically too susceptible to damage. Of course combinations of the above methods of electrically coupling the display to the keyboard could also be used.

Figure 7:
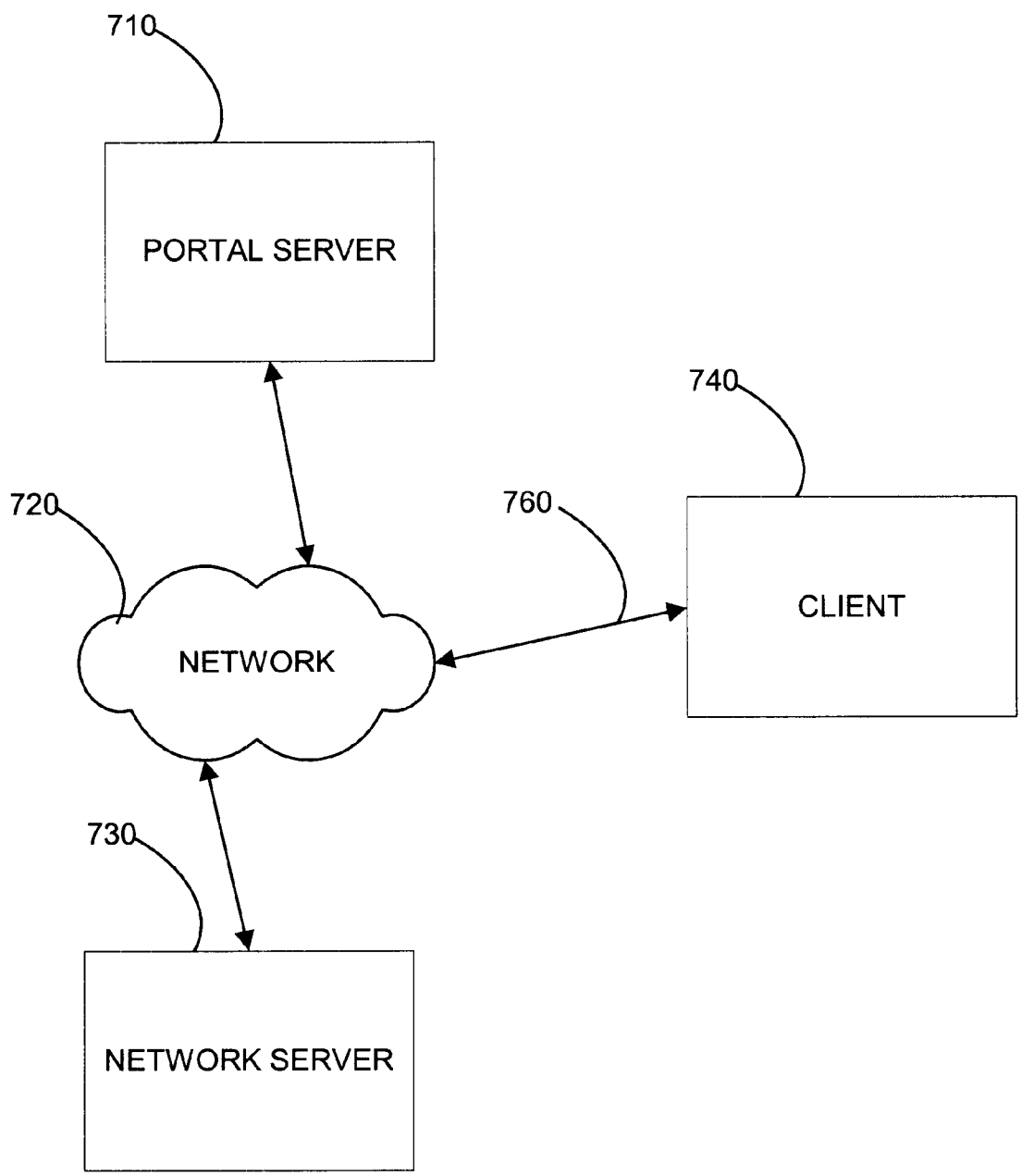
FIG. 7 illustrates one embodiment of a communication network.

Elements of the present invention may be included within a client-server based architecture 100 such as that illustrated in FIG. 7. According to the embodiment depicted in FIG. 7, a portal server 710 communicates with clients 740 and other network servers 730 over a network 720 (e.g., the Internet). The network 720 over which the clients 740 and servers 710, 730 transmit and receive data may be comprised of any combination of private (e.g., leased) and/or public communication channels. These may include, for example, Digital Signal ("DS") channels (e.g., DS-3/T-3, DS-1/T1), Synchronous Optical Network ("SONET") channels (e.g., OC-3/STS-3), Integrated Services Digital Network ("ISDN") channels, Digital Subscriber Line ("DSL") channels, cable modem channels and a variety of wireless communication channels including satellite broadcast and cellular channels.

In addition, various networking protocols may be used to support communication across the network 720 including, for example, the Asynchronous Transfer Mode ("ATM"), Ethernet, and Token Ring (at the data-link level); as well as Transmission Control Protocol/Internet Protocol ("TCP/IP"), Internetwork Packet Exchange ("IPX"), AppleTalk and DECnet (at the network/transport level). It should be noted, however, that the principles of the invention are not limited to any particular communication channel or protocol.

The portal server 710 in one embodiment includes a user database for storing various types of user configuration and account data. Users may register and login to the portal server 710 from a client 740 by specifying a user ID and/or password. According to one embodiment, a user connects to the servers 710, 730 via a browser application such as Netscape Navigator™ or Microsoft Internet Explorer™ which communicates via the Hypertext Transfer Protocol (hereinafter "HTTP").

In one embodiment, users may configure the portal server 710 to retrieve and manage specific types of information. For example, a user may configure the portal server 710 to retrieve up-to-date stock quotes for a specified set of stocks (e.g., reflecting the user's portfolio), to collect the weather forecast for the user's hometown, and/or to retrieve recent articles relating to a particular sports franchise. The portal server will then retrieve the specified information from other servers (e.g., server 730) on behalf of the user.

In addition to information retrieval and management, in one embodiment the portal server 710 also provides application services such as email, online scheduling (e.g., appointments, to-do lists, etc), instant messaging, contact management, word processing and a variety of other online services. Users may access these services by logging in to the portal server 710 with a valid user ID and password. In one embodiment, the portal server 710 generates a unique, personalized Web page for each user containing links to all, or a subset of, the information and/or services subscribed to by the user.

Figure 8:
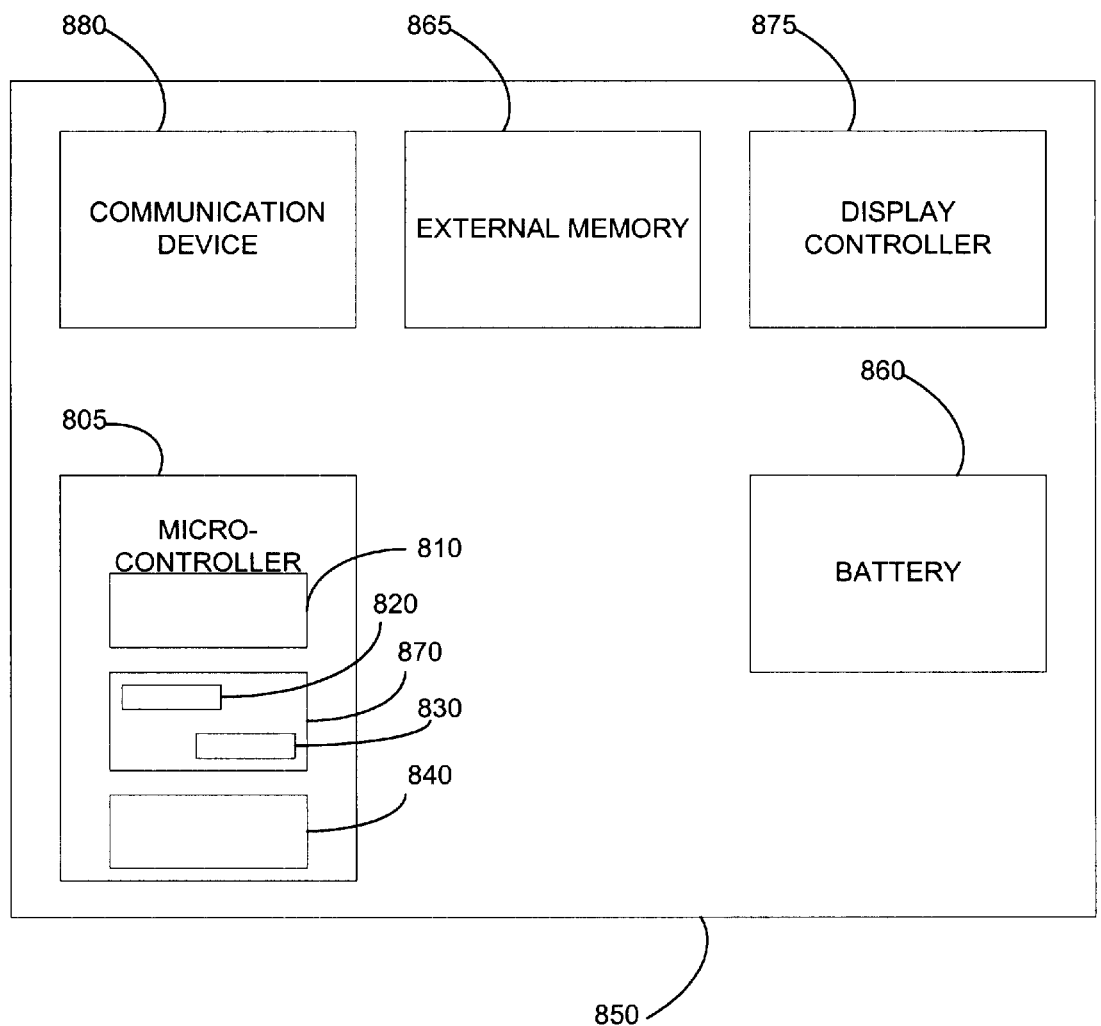
FIG. 8 illustrates one embodiment of a portal device.

As illustrated in FIG. 8, one embodiment of the portal device 850 is comprised generally of a microcontroller 805, an external memory 865, a display controller 875, and a battery 860. The external memory 850 may be used to store programs and/or portal data 865 transmitted to the portal device 850 from the portal server 810 (e.g., via client 740). In one embodiment, the external memory 865 is non-volatile memory (e.g., an electrically erasable programmable read only memory ("EEPROM"); a programmable read only memory ("PROM"), etc). Alternatively, the memory 865 may be a volatile memory (e.g., random access memory or "RAM") but the data stored therein may be continually maintained via the battery 860. The battery 860 in one embodiment is a coin cell battery (e.g., of the same type used in portable electronic devices such as calculators and watches). In one embodiment, when the battery power decreases below a threshold level, the portal device 850 will notify the user and/or the portal server 710. The portal server 710 in one embodiment will then automatically send the user a new battery.

The microcontroller 805 of one embodiment is comprised of a central processing unit ("CPU") 810, a read only memory ("ROM") 870, and a scratchpad RAM 840. The ROM 870 is further comprised of an interpreter module 820 and a toolbox module 830.

The toolbox module 830 of the ROM 870 contains a set of toolbox routines for processing data, text and graphics on the portal device 850. These routines include drawing text and graphics on the portal device's display 830, decompressing data transmitted from the portal server 810, reproducing audio on the portal device 850, and performing various input/output and communication functions (e.g., transmitting/receiving data over the client link 760). A variety of additional portal device functions may be included within the toolbox 830 while still complying with the underlying principles of the invention.

In one embodiment, microprograms and portal data 860 are transmitted from the portal server 710 to the external memory 865 of the portal device via a communication interface 880 under control of the CPU 810. Various communication interfaces 880 may be employed without departing from the underlying principles of the invention including, for example, a Universal Serial Bus ("USB") interface or a serial communication ("serial") interface. The microprograms in one embodiment are comprised of compact, interpreted instructions known as "bytecodes," which are converted into native code by the interpreter module 820 before being executed by the CPU 810. One of the benefits of this configuration is that when the microcontroller/CPU portion of the portal device 850 is upgraded (e.g., to a faster and/or less expensive model), only the interpreter module 820 and toolbox 830 of the ROM needs to be rewritten to interpret the currently existing bytecodes for the new microcontroller/CPU. In addition, this configuration allows portal devices 850 with different CPUs to coexist and execute the same microprograms. Moreover, programming frequently-used routines in the ROM toolbox module 830 reduces the size of microprograms stored in the external memory 865, thereby conserving memory and bandwidth over the client link 760. In one embodiment, new interpreter modules 820 and/or toolbox routines 830 may be developed to execute the same microprograms on cellular phones, personal information managers ("PIMs"), or any other device with a CPU and memory.

One embodiment of the ROM 870 may be comprised of interpreted code as well as native code written specifically for the microcontroller CPU 805. More particularly, some toolbox routines may be written as interpreted code (as indicated by the arrow between the toolbox 830 and the interpreter module 820) to conserve memory and bandwidth for the same reasons described above with respect to microprograms. Moreover, in one embodiment, data and microprograms stored in external memory 865 may be configured to override older versions of data/microprograms stored in the ROM 870 (e.g., in the ROM toolbox 830).

As mentioned above, the portal device 850 may communicate with the portal server 710 using various RF communication techniques. For example, in one particular embodiment, the portal device 850 transmits and receives data to/from a cellular network via the cellular digital packet data ("CDPD") standard. As it is known in the art, the CDPD standard is a digital wireless standard that is deployed as an enhancement to the existing analog cellular network. It provides a packet overlay onto the AMPS network and moves data at 19.2 Kbps over continuously-changing unused intervals in standard voice channels. Accordingly, this embodiment of the portal device is capable of exploiting normally unused bandwidth on a nation-wide, analog cellular network. Embodiments of the portal device may also be configured to transmit/receive data using a variety of other communication standards including 2-way paging standards and third generation ("3G") wireless standards (e.g., UTMS, CDMA 2000, NTT DoCoMo, . . . etc).

As indicated in FIG. 8, one embodiment of the portal device, the CPU 805 employs a 32-bit RISC-based microprocessor such as an ARM processor. As is known in the art, ARM processors are widely used in PDAs, cell phones and a variety of other wireless devices. It should be noted, however, that various other hardware and software (and/or firmware) architectures may be used for the portal device 850 while still complying with the underlying principles of the invention.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, while the system described above employs a single portal server 710, alternative embodiments of the invention may include numerous different servers (e.g., database servers, web servers, etc), and/or mirrored servers distributed across a network. Moreover, while the embodiments described above focus on a portal device which executes interpreted code (e.g., Java bytecodes), the principles of the invention may also be implemented on devices which execute non-interpreted code. Accordingly, the scope and spirit of the invention should be judged in terms of the claims which follow.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A handheld keyboard and display device comprising:
   a keyboard;
   a display, wherein the display is movably coupled to the keyboard wherein at least a portion but not all of the keyboard is covered in a closed position and wherein the display substantially uncovers the keyboard in an open position and wherein the display is visible in the closed position and in the open position.

2. The device of claim 1, wherein the display is slideably coupled to the keyboard and wherein the display and the keyboard remain parallel through the movement of the display from the closed position to the open position.

3. The device of claim 1, wherein the keyboard includes a plurality of tracks and wherein the display includes a plurality of track engagements and wherein at least one of the plurality of track engagements are engaged in at least one of the plurality of tracks and wherein the display follows the at least one of the plurality of tracks from the closed position to the open position.

4. The device of claim 1, wherein the display is movably coupled to the keyboard includes slideably coupling the display to the keyboard and wherein the display is parallel to the keyboard in the closed position and wherein the display forms an angle of less than 180 degrees with the keyboard in the open position.

5. The device of claim 1, wherein the keyboard includes a plurality of tracks and wherein the display includes a plurality of track engagements and wherein at least one of the plurality of track engagements is engaged in at least one of the plurality of tracks such that the display can slide between the closed position and the open position and wherein the display can pivot on the least one of the plurality of track engagements so that the display forms an angle or less than 180 degrees with the keyboard in the open position.

6. The device of claim 3, wherein the display and the keyboard remain parallel through the movement of the display from the closed position to the open position.

7. A handheld computing device comprising:
   a keyboard;
   a display, wherein the display is movably coupled to the keyboard wherein at least a portion but not all of the keyboard is covered in a closed position and wherein the display substantially uncovers the keyboard in an open position and wherein the display is visible in the closed position and in the open position;
   a processor;
   a memory; and
   a communication module.

8. A communication network comprising:
   one or more servers coupled by a network;
   a client communication device coupled to the network by a client link, wherein the client communication device includes:
      a keyboard;
      a display, wherein the display is movably coupled to the keyboard wherein at least a portion but not all of the keyboard is covered in a closed position and wherein the display substantially uncovers the keyboard in an open position and wherein the display is visible in the closed position and in the open position;
      a processor;
      a memory; and
      a communication module.

9. A handhold keyboard and display device comprising:
   a keyboard;
   a display, wherein the display is movably coupled to the keyboard by a pivot with an axis perpendicular to the keyboard's plane such that the display and keyboard are parallel to each other and wherein at least a portion of the keyboard is covered in a closed position and wherein the display substantially uncovers the keyboard in an open position and wherein the display is visible in the closed position and in the open position.

10. The device of claim 1, wherein the display displays information and wherein the information is rotated such that the information is displayed in a first orientation of the screen in the closed position and the information is displayed in a second orientation in the open position.

11. A handheld keyboard and display device comprising:
   a keyboard;
   a display, wherein the display is movably coupled to the keyboard wherein at least a portion of the keyboard is covered in a closed position and wherein the display substantially uncovers the keyboard in an open position and wherein the display is visible in the closed position and in the open position; and
   a support coupled to an edge of the display and also coupled to a corresponding edge of the keyboard.

12. A handheld keyboard and display device comprising:
   a keyboard having a first edge and a second edge opposite the first edge;
   a first, second, third, and fourth support, all of about equal length; and
   a display, wherein the display is movably coupled to the keyboard by the first, second, third, and fourth supports wherein the first and second supports are both coupled at one end to said first edge and coupled at the other end to a first corresponding edge of the display and wherein the third and fourth supports are both coupled at one end to said second edge and coupled at the other end to a second corresponding edge of the display and wherein at least a portion of the keyboard is covered in a closed position and wherein the display substantially uncovers the keyboard in an open position and wherein the display is visible in the closed position and in the open position.

13. The device of claim 12 wherein the first and third supports are of one length and the second and fourth supports are of another length.

* * * * *